United States Patent
Armstrong et al.

(10) Patent No.: US 6,279,046 B1
(45) Date of Patent: Aug. 21, 2001

(54) EVENT-DRIVEN COMMUNICATIONS INTERFACE FOR LOGICALLY-PARTITIONED COMPUTER

(75) Inventors: William Joseph Armstrong, Kasson; Naresh Nayar, Rochester, both of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/314,187

(22) Filed: May 19, 1999

(51) Int. Cl.[7] .............................. G06F 3/00; G06F 15/00
(52) U.S. Cl. .................... 710/5; 710/20; 703/16; 703/17
(58) Field of Search .................... 710/5, 19, 20, 710/36, 74; 709/1, 300, 213; 712/220, 13; 703/16, 17

(56) References Cited

U.S. PATENT DOCUMENTS

| | | | |
|---|---|---|---|
| 5,365,514 | * 11/1994 | Hershey et al. | 370/241 |
| 5,446,902 | * 8/1995 | Islam | 395/703 |
| 5,526,488 | * 6/1996 | Hershey et al. | 709/242 |
| 5,566,337 | 10/1996 | Szymanski et al. | 395/733 |
| 5,684,974 | * 11/1997 | Onodera | 711/202 |
| 5,819,061 | * 10/1998 | Glassen et al. | 709/1 |
| 5,828,882 | 10/1998 | Hinckley | 395/680 |
| 5,845,146 | 12/1998 | Onodera | 395/822 |
| 5,923,890 | * 7/1999 | Kubala et al. | 712/1 |
| 5,996,026 | * 11/1999 | Onodera et al. | 710/3 |
| 6,148,323 | * 11/2000 | Whitner et al. | 709/105 |
| 6,173,337 | * 1/2001 | Akhond et al. | 709/318 |
| 6,199,179 | * 3/2001 | Kauffman et al. | 714/26 |

OTHER PUBLICATIONS

Abstract for JAPIO Application No. 94–103092, T. Imada et al., Apr. 15, 1994, "Virtal Compter System."
Abstract for JAPIO Application No. 92–348434, T. Imada et al., Dec. 3, 1992, "Virtual Computer System."
Inspec Abstract No. C9408–6110P–022, A. B. Gargaro et al., Mar. 1994, "Supporting Distribution and Dynamic Reconfiguration in AdaPT."

* cited by examiner

Primary Examiner—Thomas Lee
Assistant Examiner—Chun Cao
(74) Attorney, Agent, or Firm—Wood, Herron & Evans, L.L.P.

(57) ABSTRACT

An apparatus, program product and method utilize an event-driven communications interface to support communications between multiple logical partitions in a logically-partitioned computer. The event-driven communications interface is at least partially disposed within a partition manager that is accessible to each of the logical partitions. Events are typically passed between logical partitions in the form of messages that are passed first from a source logical partition that initiates the event, through the partition manager, and then to a target logical partition to which the event is directed, while maintaining the independent address spaces associated with the logical partitions.

25 Claims, 6 Drawing Sheets

EVENT-DRIVEN COMMUNICATIONS INTERFACE FOR LOGICALLY-PARTITIONED COMPUTER

RELATED APPLICATIONS

This patent application is related to the following patent applications: U.S. patent application, entitled "Apparatus and Method for Specifying Maximum Interactive Performance in a Logical Partition of a Computer System Independently from the Maximum Interactive Performance in Other Partitions," Ser. No. 09/314,541 filed May 19, 1999 by Armstrong et al.; U.S. patent application, entitled "Processor Reset Generated via Memory Access Interrupt," Ser. No. 09/314,769 filed May 19, 1999 by Armstrong et al.; U.S. Patent Application R0999-023, entitled "Management of a Concurrent Use License in a Logically-Partitioned Computer," Ser. No. 09/314,324 filed May 19, 1999 by Armstrong et al.; and U.S. Patent Application, entitled "Logical Partition Manager and Method," Ser. No. 09/314,214 filed May 19, 1999 by Armstrong et al.

FIELD OF THE INVENTION

The invention is generally related to computers and computer software. In particular, the invention is generally related to management of multiple logical partitions in a logically-partitioned computer.

BACKGROUND OF THE INVENTION

Computer technology continues to advance at a rapid pace, with significant developments being made in both software and in the underlying hardware upon which such software executes. One significant advance in computer technology is the development of multi-processor computers, where multiple computer processors are interfaced with one another to permit multiple operations to be performed concurrently, thus improving the overall performance of such computers. Also, a number of multi-processor computer designs rely on logical partitioning to allocate computer resources to further enhance the performance of multiple concurrent tasks.

With logical partitioning, a single physical computer is permitted to operate essentially like multiple and independent "virtual" computers (referred to as logical partitions), with the various resources in the physical computer (e.g., processors, memory, input/output devices) allocated among the various logical partitions. Each logical partition executes a separate operating system, and from the perspective of users and of the software applications executing on the logical partition, operates as a fully independent computer.

A shared resource, often referred to as a "hypervisor" or partition manager, manages the logical partitions and facilitates the allocation of resources to different logical partitions. As a component of this function, a partition manager maintains separate virtual memory address spaces for the various logical partitions so that the memory utilized by each logical partition is fully independent of the other logical partitions. One or more address translation tables are typically used by a partition manager to map addresses from each virtual address space to different addresses in the physical, or real, address space of the computer. Then, whenever a logical partition attempts to access a particular virtual address, the partition manager translates the virtual address to a real address so that the shared memory can be accessed directly by the logical partition.

An important design rule that is enforced in most logically-partitioned computers is that the virtual address space of each logical partition is completely inaccessible to other logical partitions. Strict policies are enforced by the partition manager to limit access to the virtual addresses within a logical partition's address space to only that logical partition. Furthermore, logical partitions are not permitted to access memory using real addresses so that a logical partition is not able to corrupt the memory of another partition by using a real address that it does not own. By doing so, each logical partition is better able to emulate a separate physical computer, and applications that are originally designed for a non-partitioned computer are often able to execute within a logical partition without modification or customization.

An undesirable side effect of the strict memory access rules, however, is that communication between logical partitions is typically very restricted. Since each logical partition operates as if it were a separate physical computer, typically the only form of inter-partition communication is via a conventional network interface, in much the same manner as any computer would utilize to communicate with another physical computer on a network. To implement such an interface, often each logical partition is assigned a separate network adaptor resource in the computer, and the actual communication passes from one network adaptor on the physical computer, over an external network to which both network adaptors are connected, and back to the other network adaptor on the computer. Communications in this manner can be relatively slow and cumbersome, and typically relatively expensive, at least as compared to internal communications within the processing core of a computer.

Therefore, a significant need exists in the art for an improved manner of permitting communication between the logical partitions within a computer, while still conforming to the memory access controls that maintain the independence of each logical partition.

SUMMARY OF THE INVENTION

The invention addresses these and other problems associated with the prior art by providing an apparatus, program product, and method that utilize an event-driven communications interface to support communications between multiple logical partitions in a logically-partitioned computer, particularly where each logical partition operates in an independent address space from other logical partitions. The event-driven communications interface is at least partially disposed within a partition manager that is accessible to each of the logical partitions.

In embodiments consistent with the invention, events are typically passed between logical partitions in the form of messages that are passed first from a source logical partition that initiates the event, through the partition manager, and then to a target logical partition to which the event is directed. Passage of events between logical partitions typically occurs completely through the internal hardware components of the computer, and usually with relatively little overhead, thereby providing performance that is superior to the use of external networks and the like. Also, by passing such messages between logical partitions in the form of events, communications can occur without compromising the independence of the address spaces of the logical partitions.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Hardware and Software Environment

Figure 1:
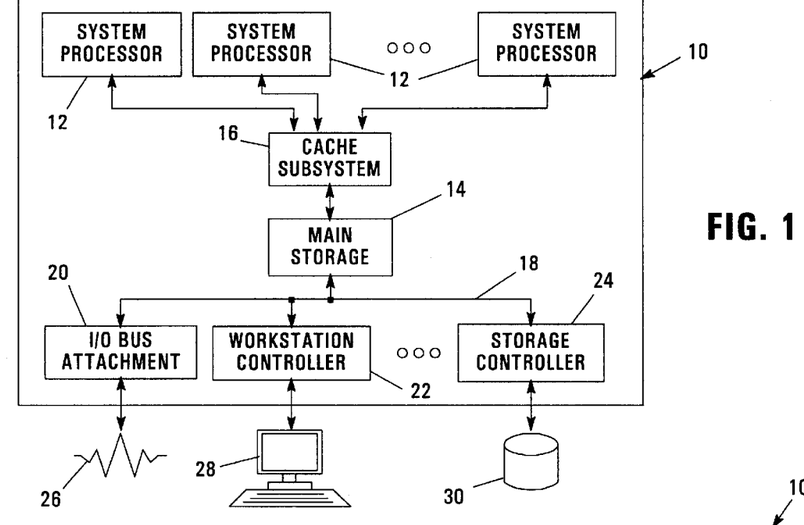
FIG. 1 is a block diagram of a computer consistent with the invention.

Turning to the Drawings, wherein like numbers denote like parts throughout the several views, FIG. 1 illustrates a data processing apparatus or computer 10 consistent with the invention. Apparatus 10 generically represents, for example, any of a number of multi-user computer systems such as a network server, a midrange computer, a mainframe computer, etc. However, it should be appreciated that the invention may be implemented in other data processing apparatus, e.g., in stand-alone or single-user computer systems such as workstations, desktop computers, portable computers, and the like, or in other computing devices such as embedded controllers and the like. One suitable implementation of apparatus 10 is in a midrange computer such as the AS/400 series computer available from International Business Machines Corporation.

Apparatus 10 generally includes one or more system processors 12 coupled to a memory subsystem including main storage 14, e.g., an array of dynamic random access memory (DRAM). Also illustrated as interposed between processors 12 and main storage 14 is a cache subsystem 16, typically including one or more levels of data, instruction and/or combination caches, with certain caches either serving individual processors or multiple processors as is well known in the art. Furthermore, main storage 14 is coupled to a number of types of external (I/O) devices via a system bus 18 and a plurality of interface devices, e.g., an input/output bus attachment interface 20, a workstation controller 22 and a storage controller 24, which respectively provide external access to one or more external networks 26, one or more workstations 28, and/or one or more storage devices such as a direct access storage device (DASD) 30.

Figure 2:
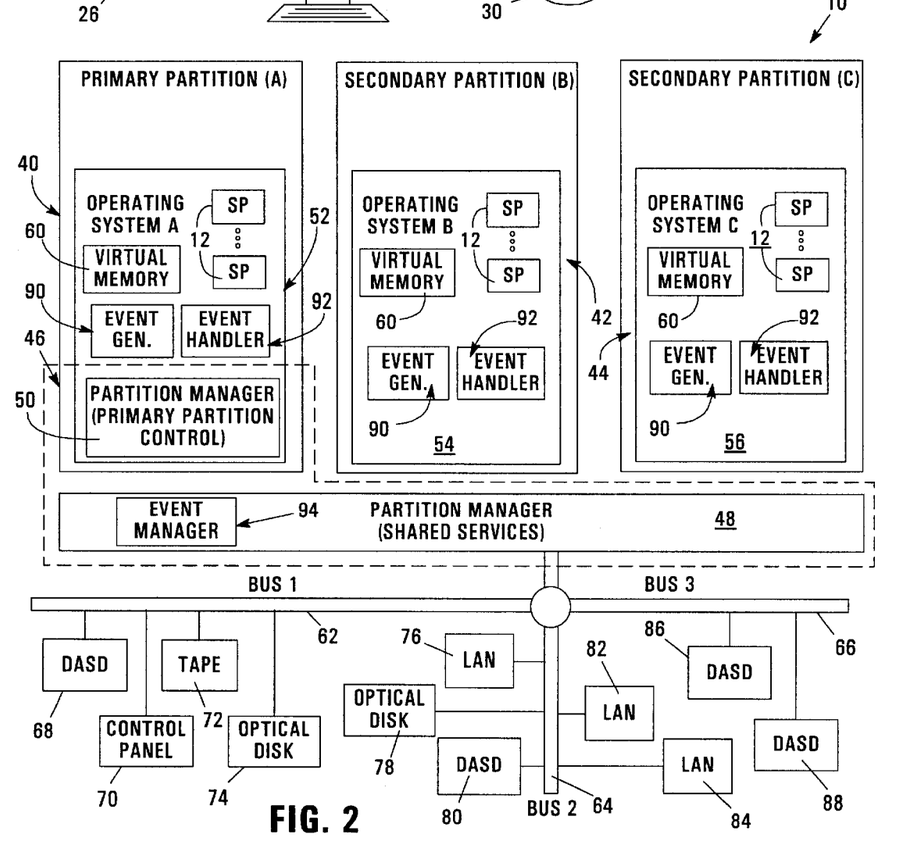
FIG. 2 is a block diagram of the primary software components and resources in the computer of FIG. 1.

FIG. 2 illustrates in greater detail the primary software components and resources utilized in implementing a logically partitioned computing environment on computer 10, including a plurality of logical partitions 40, 42, 44 managed by a partition manager 46. Any number of logical partitions may be supported as is well known in the art.

In the illustrated implementation, logical partition 40 operates as a primary partition, while logical partitions 42 and 44 operate as secondary partitions. A primary partition in this context shares some of the partition management functions for the computer, such as handling the powering on or powering off of the secondary logical partitions on computer 10, or initiating a memory dump of the secondary logical partitions. As such, a portion of partition manager 46 is illustrated by primary partition control block 50, disposed in the operating system 52 resident in primary partition 40. Other partition management services, which are accessible by all logical partitions, are represented by shared services block 48. Implementation of partition management functionality within a primary logical partition is described, for example, in U.S. Patent Application, entitled "Logical Partition Manager and Method," Ser. No. 09/314,214, filed on May 19, 1999 by Armstrong et al., which is incorporated by reference herein. However, partition management functionality need not be implemented within any particular logical partition in other implementations consistent with the invention.

Each logical partition utilizes an operating system (e.g., operating systems 52, 54 and 56 for logical partitions 40, 42 and 44, respectively), that controls the primary operations of the logical partition in the same manner as the operating system of a non-partitioned computer. For example, each operating system 52–56 may be implemented using the OS/400 operating system available from International Business Machines Corporation, residing on top of a kernel, e.g., AS/400 system licensed internal code (SLIC). The shared services in block 48 are alternatively referred to herein as partition licensed internal code (PLIC).

Each logical partition 40–44 executes in a separate, or independent, memory space, represented by virtual memory 60. Moreover, each logical partition 40–44 is statically and/or dynamically allocated a portion of the available resources in computer 10. For example, each logical partition is allocated one or more processors 12, as well as a portion of the available memory space for use in virtual memory 60. Logical partitions can share specific hardware resources such as processors, such that a given processor is utilized by more than one logical partition. In the alternative hardware resources can be allocated to only one logical partition at a time.

Additional resources, e.g., mass storage, backup storage, user input, network connections, and the like, are typically allocated to one or more logical partitions in a manner well known in the art. Resources can be allocated in a number of manners, e.g., on a bus-by-bus basis, or on a resource-by-resource basis, with multiple logical partitions sharing resources on the same bus. Some resources may even be allocated to multiple logical partitions at a time. FIG. 2 illustrates, for example, three logical buses 62, 64 and 66, with a plurality of resources on bus 62, including a direct access storage device (DASD) 68, a control panel 70, a tape drive 72 and an optical disk drive 74, allocated to primary logical partition 40. Bus 64, on the other hand, may have resources allocated on a resource-by-resource basis, e.g., with local area network (LAN) adaptor 76, optical disk drive 78 and DASD 80 allocated to secondary logical partition 42, and LAN adaptors 82 and 84 allocated to secondary logical partition 44. Bus 66 may represent, for example, a bus allocated specifically to logical partition 44, such that all resources on the bus, e.g., DASD's 86 and 88, are allocated to the same logical partition.

It will be appreciated that the illustration of specific resources in FIG. 2 is merely exemplary in nature, and that any combination and arrangement of resources may be allocated to any logical partition in the alternative. Moreover, it will be appreciated that in some implementations resources can be reallocated on a dynamic basis to service the needs of other logical partitions. Furthermore, it will be appreciated that resources may also be represented in terms of the input/output processors (IOP's) used to interface the computer with the specific hardware devices.

The various software components and resources illustrated in FIG. 2 and implementing the embodiments of the invention may be implemented in a number of manners, including using various computer software applications, routines, components, programs, objects, modules, data structures, etc., referred to hereinafter as "computer programs", or simply "programs". The computer programs typically comprise one or more instructions that are resident at various times in various memory and storage devices in the computer, and that, when read and executed by one or more processors in the computer, cause that computer to perform the steps necessary to execute steps or elements embodying the various aspects of the invention. Moreover, while the invention has and hereinafter will be described in the context of fully functioning computers, those skilled in the art will appreciate that the various embodiments of the invention are capable of being distributed as a program product in a variety of forms, and that the invention applies equally regardless of the particular type of signal bearing medium used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Event-Driven Communications Interface

The illustrated embodiments of the invention generally utilize an event-driven communications interface to support communications between logical partitions in a logically-partitioned computer. The event-driven communications interface in the illustrated embodiments passes events between logical partitions in the form of message records that are passed from a source logical partition to the partition manager, and then from the partition manager to the target logical partition. Each logical partition maintains one or more event stacks that are polled by the logical partition on a periodic basis to determine whether any events have been placed on a logical partition's stacks since the last poll. For any pending events, the target logical partition calls an appropriate event handler, which, in addition to acting on the event, may also send an acknowledgment (ACK) event back to the original source logical partition via essentially the same event structure.

In the illustrated embodiment, the event-based communications interface has components implemented within the partition manager as well as each logical partition. As shown in FIG. 2, for example, computer 10 includes a communications interface that utilizes event generator 90 and event handler 92 modules within each logical partition 40, 42 and 44 to respectively generate and process events within the corresponding logical partition. An event manager 94 within partition manager 46 handles the passage of events between the event generator of a source logical partition and the event handler 92 of a target logical partition, as well as the maintenance of available message records and processing of ACK events in a manner that will become more apparent below.

It will be appreciated that other event-based communication protocols may be used in the alternative. Moreover, it will be appreciated that the particular allocation of functionality between the event manager, the event generators and the event handlers, as well as between the partition manager and the logical partitions, may vary in other applications. Therefore, the invention is not limited to the particular implementation disclosed herein.

Figure 3:
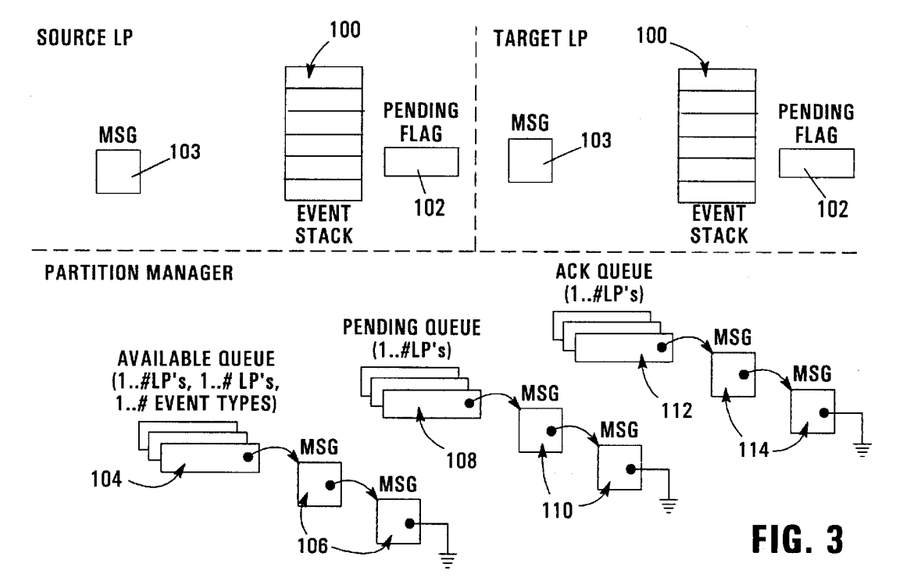
FIG. 3 is a block diagram of data structures utilized by an event-driven communications interface in the computer of FIGS. 16–2.

FIG. 3 illustrates several data structures for use in the event-driven communications system of FIG. 2. Specifically, each logical partition typically includes one or more event storage data structures, e.g., event stacks 100, with each including a pending flag 102 associated therewith. Each logical partition also includes storage for a message record 103 that the logical partition utilizes to construct event messages to be passed to other logical partitions in the manner disclosed herein.

In the illustrated implementation, each event storage data structure 100 is implemented as a circular stack, although other stacks, e.g. push-pull stacks and the like, as well as other data structures, may also be used in the alternative. Moreover, while only one such event storage data structure 100 is shown per partition, it will be appreciated that multiple data structures may be utilized in some implementations, e.g., to improve performance and storage capacity. For example, in implementations in which multiple processors are allocated to a particular logical partition, it may be desirable to include an event stack for each such processor.

Pending flag 102 stores an indicator as to whether any pending events are stored in the partition manager and awaiting reception by the logical partition with which the pending flag is associated. Typically, each pending flag 102 is associated with a particular event stack 100, such that multiple pending flags may be utilized if multiple event stacks are utilized in a logical partition. Other data structures may also be used in the alternative to indicate when pending events are awaiting reception by a logical partition.

Within partition manager is provided a series of queues to maintain message records that are passed between logical partitions to implement the event-driven communications interface discussed herein. Illustrated at 104 are a plurality of available queues, each including a linked list of message records 106. Each available queue is utilized to store a number of unused message records. In the illustrated implementation, one available queue is allocated for each potential path between a source logical partition and a target logical partition. Moreover, for each such path, one available queue is utilized for each event type. As such, the available queues 104 are organized into a three-dimensional array indexed by source logical partition, target logical partition, and event type, with a total of available queues equaling the product of the number of event types and the square of the number of logical partitions.

The array of available queues functions as a pre-allocated fixed heap of message records. It will be appreciated, however, that memory for message records may be dynamically allocated in other implementations. Moreover, if certain logical partitions are not utilized as source or target logical partitions, the number of available queues may be decreased accordingly.

Two other arrays of queues are also provided in the partition manager. First, an array of pending queues 108, each including a plurality of message records 110 stored in the form of a linked list, is utilized to store events that are pending to be transferred to different logical partitions. One pending queue is provided for each logical partition, with the array indexed by target logical partition. Moreover, if any logical partition utilizes more than one event stack, a pending queue is allocated for each such event stack.

Second, an array of acknowledgment (ACK) queues 112 is provided to maintain a linked list of message records 114 waiting to be returned to a source logical partition as an acknowledgment to a previous event passed to a target logical partition. As with the array of pending queues, one ACK queue is provided for each logical partition. Moreover, if any logical partition includes more than one event stack, an ACK queue is provided for each such stack.

With the arrangement of FIG. 3, a fixed number of message records can be allocated once and repeatedly passed between the various queues on an as-needed basis, thereby eliminating the need to dynamically allocate memory for new events, ACK's and the like. Other data storage techniques, however, may be used to implement event-driven communications consistent with the invention.

Figure 4:
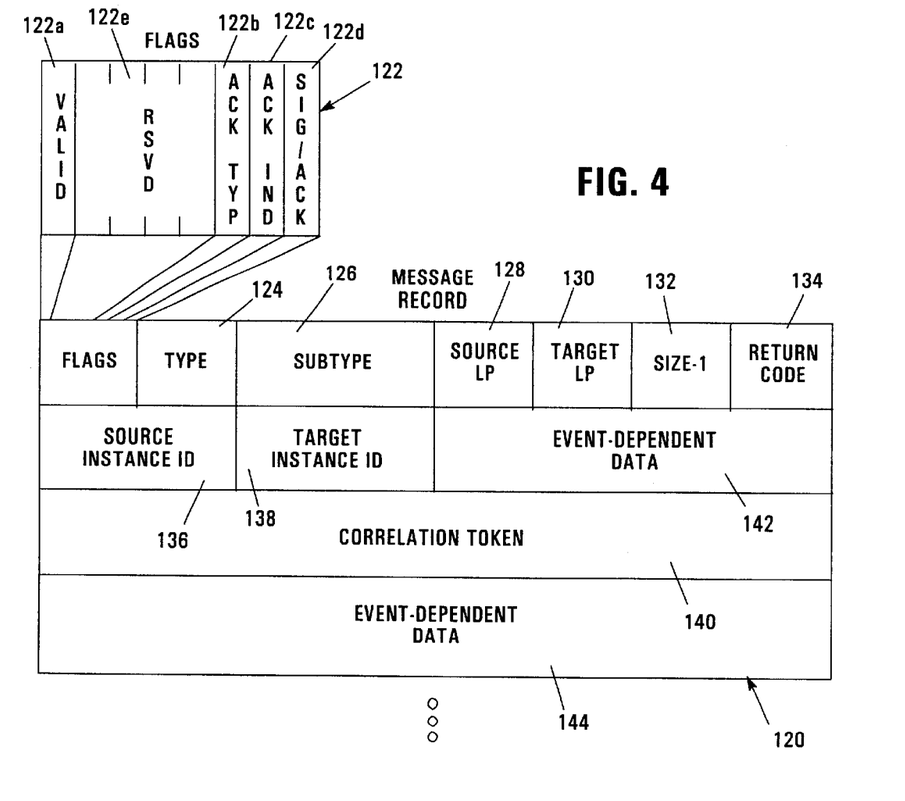
FIG. 4 is a block diagram of an exemplary message record format for the event-driven communications interface in the computer of FIGS. 1–2.

FIG. 4 next illustrates one suitable format for a message record 120 utilized by each of the queues in FIG. 3. Each message record in the illustrated embodiment is of variable size, with a minimum size of 24 bytes, and a maximum size of 256 bytes. Each message record includes a header including a plurality of fields, e.g., fields 122–140. Field 122 is an 8-bit (1-byte) field including a series of 1-bit flags 122a–122d, including a valid flag 122a, an ACK type flag 122b, an ACK indicator flag 122c, and a SIG/ACK flag 122d. Additional reserved space, shown at 122e, may also be included within field 122.

Valid flag 122a is used to indicate when the data in the message record is valid and remains to be processed by the target logical partition. Flag 122b indicates whether an ACK requested for a particular event is an immediate or deferred type of acknowledgment. Flag 122c is used to indicate whether an acknowledgment is required for the event specified in the message record. Flag 122d is utilized to indicate whether the message record for a new event or an acknowledgment.

In the illustrated implementation, an immediate acknowledgment requires that the target logical partition provide an acknowledgment back to the source logical partition in response to an event requesting such acknowledgment. A deferred acknowledgment, on the other hand, does not require an immediate acknowledgment from the target logical partition, and can be used as a form of subscription or registration mechanism that permits a source logical partition to be automatically notified in response to termination of a target logical partition.

As will be discussed in greater detail below, such a configuration enables a source logical partition, e.g., a primary logical partition, to essentially subscribe to be notified should any target logical partition, e.g., a secondary logical partition, terminate. Subscription in the illustrated embodiment typically requires that the event generator for the source logical partition generate an event for each target logical partition to be tracked, with each such event having flags 122b and 122c of the associated message record indicating that a deferred ACK is requested for the event. Then, should a target logical partition terminate, the event manager will automatically return the deferred ACK to the source logical partition. In some implementations, it may also be desirable to support the use of separate immediate and deferred ACK queues for each logical partition, so that only deferred ACK's may be automatically issued in response to termination of a logical partition.

Field 124 is an 8-bit (1-byte) type field that supports up to 256 different event types. In turn, field 126 is a 16-bit subtype field supporting 65,536 possible events under each event type. As will be discussed in greater detail below, each event type has associated therewith a specific event handler routine and optionally an acknowledge handler routine associated with that event type. It is anticipated that each specific event under a given event type may be handled (at least initially) by the same event handler routine.

Fields 128 and 130 are 1-byte identifiers respectively identifying the source and target logical partitions associated with the event (thus providing support for up to 256 logical partitions), and field 132 is a 1-byte value indicating one less than the overall size of the message record (thus enabling a message record to be as large as 256 bytes).

Field 134 is a one byte return code that provides status information to the source and target logical partitions. The return code may specify any number of details regarding an event, e.g., a successful result, an unavailable buffer to queue an event, a successful cancel event operation, an invalid address, an invalid partition identifier, an invalid record size, an invalid type or sub-type, invalid event data, a terminated logical partition, a closed event path, a generic error, or any other information that may be relevant to a source logical partition. Moreover, a return code may also indicate that additional error information is provided in the event-specific data associated with the message record.

Fields 136 and 138 respectively provide 16-bit source and target instance identifiers. The source and target instance identifiers are established whenever a source logical partition attempts to open a designated path to a particular target logical partition. In the illustrated implementation, a source logical partition opens such a path by requesting allocation of a path from the partition manager, receiving in response a pair of identifiers associated with that path for use by future events communicating over the path. Validity checking of source and target instance identifiers within the partition manager simplifies serialization through restricting communications between logical partitions while an active path is established. As such, whenever a path is closed by a logical partition or by the partition manager, the instance identifiers for the path become invalid, and further communications over the path are prohibited.

Field 140 stores a 64-bit correlation token, which is generated by the source logical partition and utilized by the partition manager to match acknowledgments with corresponding events. The source logical partition also uses the correlation token to match acknowledgments with locally stored message data for issued events.

Field 142 includes a 32-bit event-dependent data field used to provide additional data required for a particular event. For events that require additional data beyond that provided in field 142, field 144 provides a variable-sized data field that can be from 0 to 232 bytes in length, thereby providing an overall message record size of 24 to 256 bytes.

Various modifications may be made to the illustrated message record consistent with the invention. For example, a message record may be a fixed size, thereby omitting the need for a separate size field. Moreover, an innumerable number of variations of arrangements and sizes of fields, as well as other combinations of data, may be stored within a message record consistent with the invention. Therefore, the invention should not be limited to the particular arrangement of information illustrated herein.

To support event-driven communications consistent with the invention, event manager 94 includes a set of functions, or services, available to each logical partition. For example, event manager 94 in the illustrated implementation provides at least a signal event function (signalLPEvent( )), a get pending events function (getPendingLPEvents( )), a signal acknowledgment function (signalLPACK( )) and a cancel pending event function (cancelLPEvent( )). Additional services, e.g., permitting a logical partition to modify or retrieve specific data fields within a message record may also be supported, the use and configuration of which will be apparent to one of ordinary skill in the art having benefit of the instant disclosure.

Figure 5:
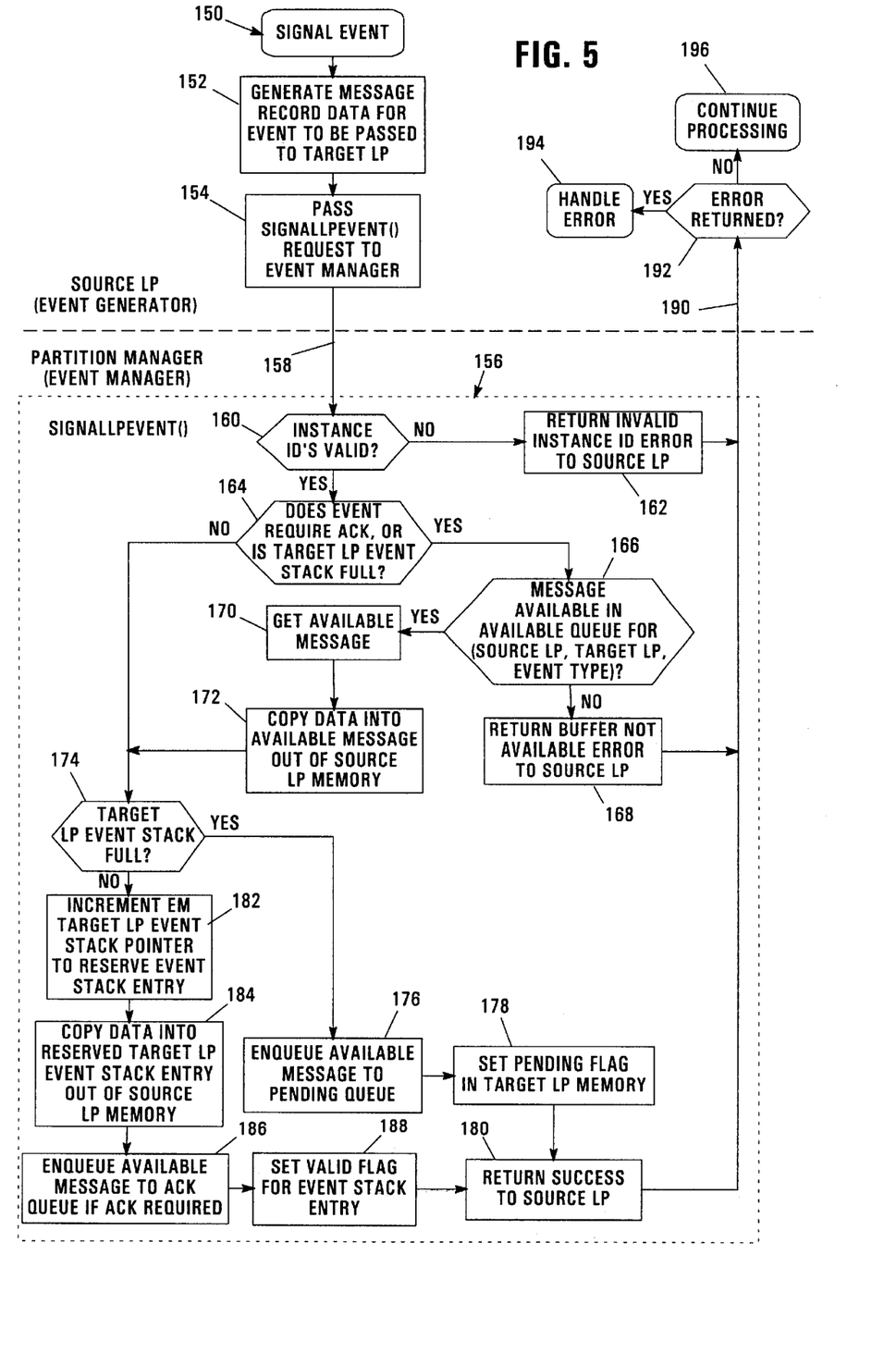
FIG. 5 is a flowchart illustrating the program flow of a signal event routine for the event-driven communications interface in the computer of FIGS. 1–2.
Figure 6A:
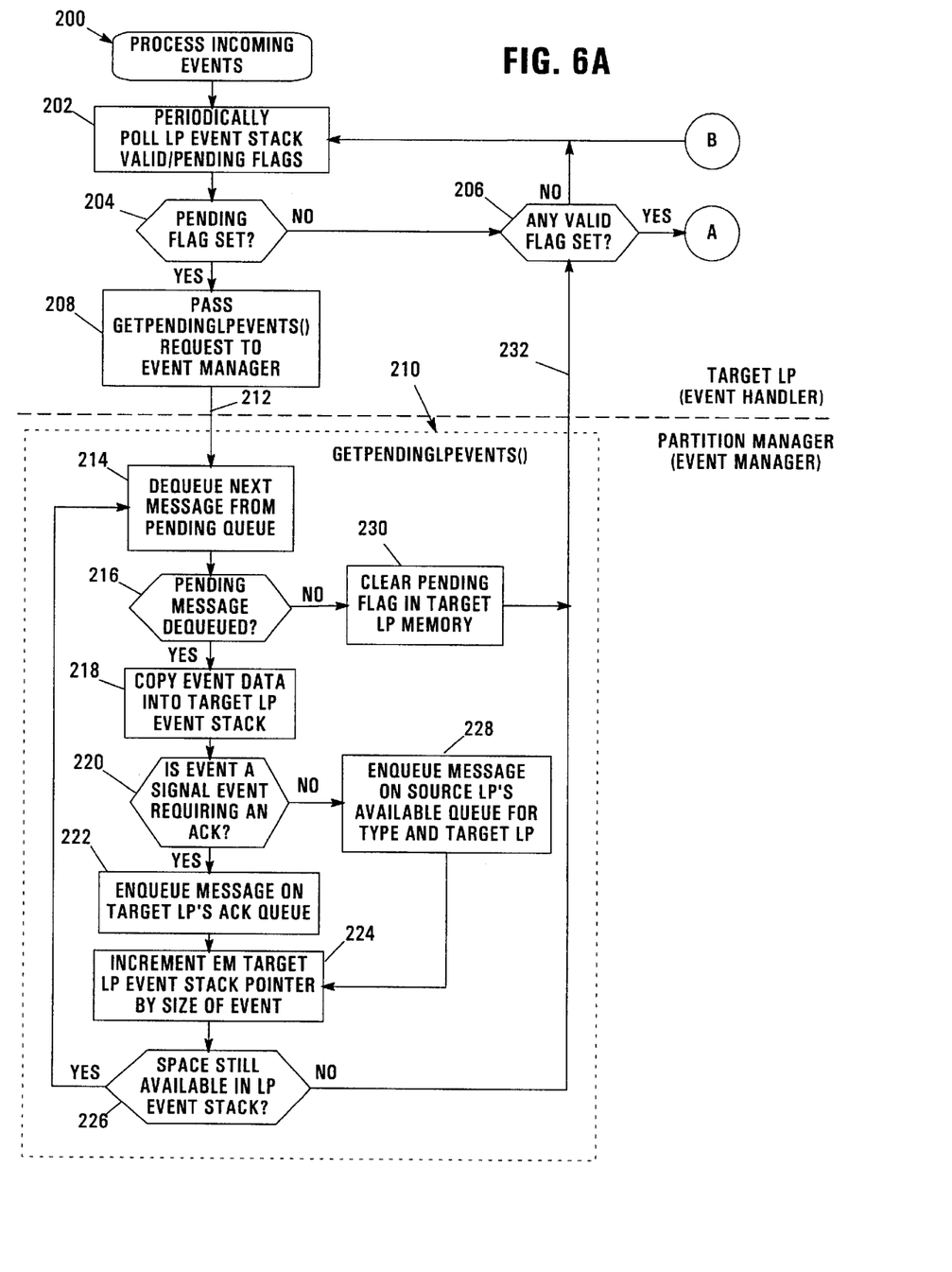
FIGS. 6A and 6B are flowcharts illustrating the program flow of a process incoming events routine for the event-driven communications interface in the computer of FIGS. 1–2.
Figure 6B:
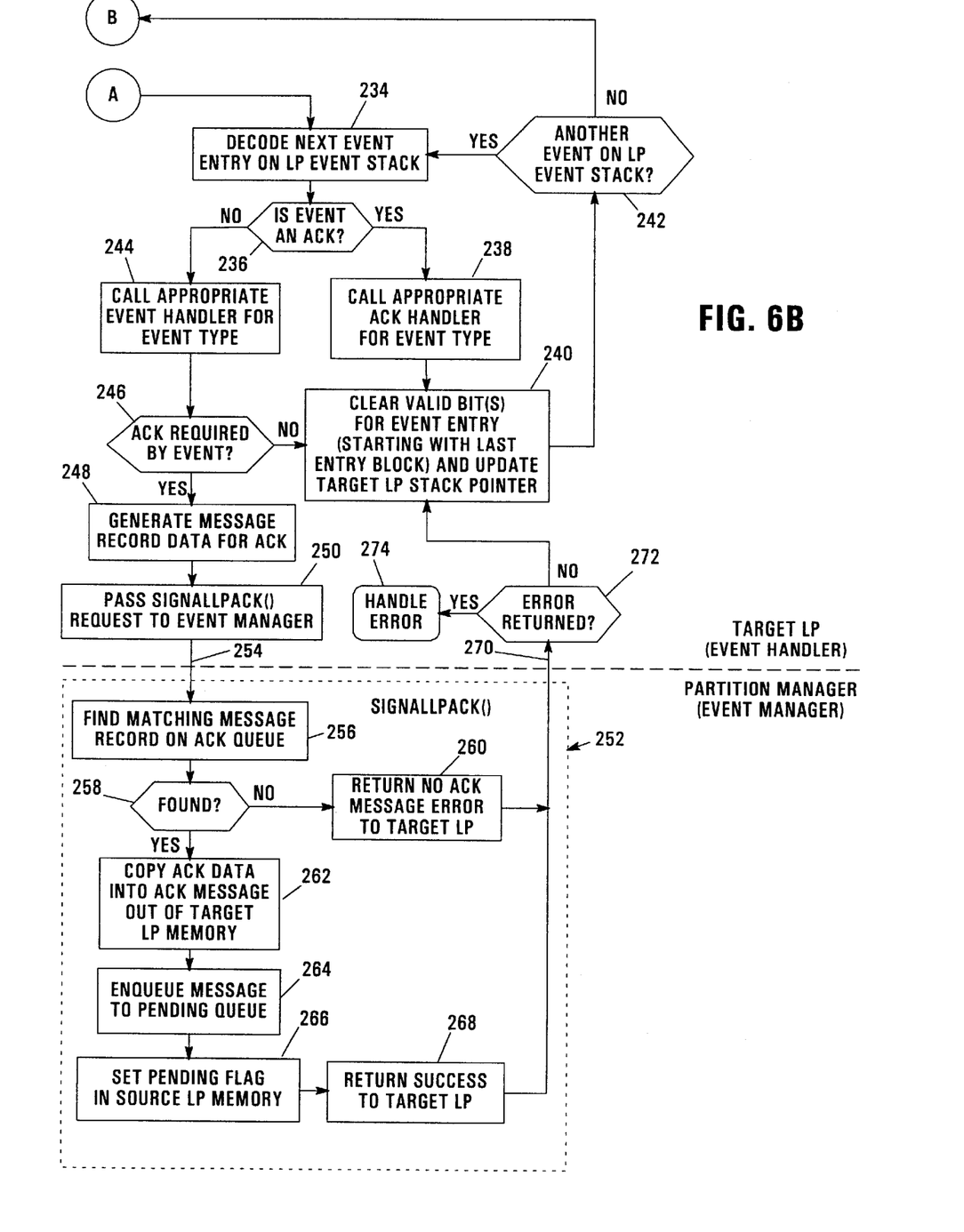
Figure 7:
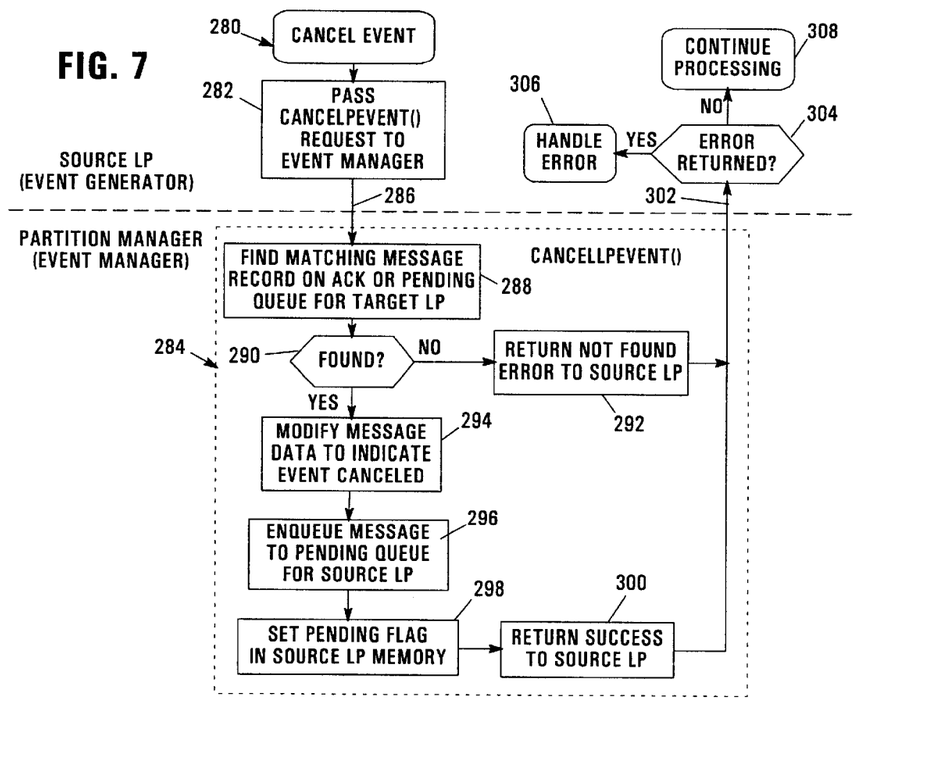
FIG. 7 is a flowchart illustrating the program flow of a cancel event routine for the event-driven communications interface in the computer of FIGS. 1–2.

To better illustrate the basic services provided by event manager 94, FIGS. 5–7 illustrate the interaction of an event manager with an event generator in a source logical partition and an event handler in a target logical partition. For example, FIG. 5 illustrates a signal event routine 150 initiated by an event generator in a source logical partition for the purpose of passing an event to a target logical partition.

Routine 150 begins in block 152 by generating message record data for the event to be passed to a particular target logical partition, typically within the message data storage 103 provided in the source logical partition (see FIG. 3). Next, in block 154, a signalLPEvent( ) function 156 in the event manager is called by the event generator in the source logical partition, as represented at 158. Provided with this function call is a pointer to the message data record in the source logical partition.

Function 156 begins in block 160 by determining whether the instance ID's provided with the message record data are valid. In addition, at this time additional format checking may occur, e.g., to verify whether the size of the message record is within a valid range, etc. If not, an invalid instance ID error is returned to the source logical partition in block 162, typically by storing a unique code in the return code field of the message record provided to the function.

If, however, the instance ID's are valid, control passes to block 164 to determine whether the event requires an acknowledgment, or alternatively, whether the target logical partition event stack is full. In the illustrated implementation, a determination of whether the event requires an acknowledgment is performed by checking flag 122c of the message record provided to the event manager. Determination of whether the target logical partition event stack is full is made by first identifying the target logical partition from the message record provided in the function call, and then testing the valid flag 122a to see if the target logical partition has already processed the previous event. If not, then the event stack is fill.

In this regard, in the illustrated implementation, the partition manager maintains a real address pointer for each event stack in each logical partition that points to the next entry at which to copy an event. A corresponding virtual address pointer is also separately maintained in the logical partition. The pointers are initially determined whenever a logical partition makes a request to the partition manager to allocate memory for a new event stack during initial program load (IPL). During such a request, the partition manager allocates the memory for the event stack and returns a virtual address pointer to the logical partition. At that time, the partition manager also caches the real address of the virtual address pointer such that the event stack can be later accessed by the partition manager as well. The configuration of such an initialization routine is within the ability of one of ordinary skill in the art having the benefit of the instant disclosure, and thus is not discussed further herein. In addition, other manners of maintaining a record of a current position in an event stack may also be utilized in the alternative.

Returning to block 164, if either the event requires an acknowledgment or the target logical partition event stack is full, control passes to block 166 to attempt to retrieve a message record from the available queue for the particular source logical partition, target logical partition, and event type specified in the message record provided to the function. Block 166 determines whether such a message record is available on the available queue. If no such message record is available, control passes to block 168 to return a "buffer not available" error to the source logical partition, typically within the return code field of the message record. If, however, a message record is available, control passes to block 170 to get the available message record by retrieving the pointer to the record. Next, block 172 copies the message record data provided to the function into the available message record. Control then passes to block 174. Moreover, returning to block 164, if the event does not require an acknowledgment, and the target logical partition event stack is not fill, block 164 passes control directly to block 174, bypassing blocks 166-172.

Block 174 again determines whether the target logical partition event stack is full. If so, control passes to block 176 to enqueue the available message to the pending queue for the target logical partition. With the linked list implementation of each queue in the illustrated embodiment, enqueuing a message record typically constitutes removing the message record from the chain of records in the available queue and inserting the message record into the chain of records in the pending queue, both of which are routine list operations that involve merely updating pointers, rather than actually moving the message record data to a new location in memory. For other data structures, other operations may be required.

Next, block 178 sets the pending flag associated with the target logical partition to indicate to that partition that a pending event is currently on the pending queue associated with that logical partition. Control then passes to block 180 to return a "success" code to the source logical partition.

Returning to block 174, if the target logical partition event stack is not fill, control passes to block 182 to increment the event manager's target logical partition event stack pointer to reserve the next event stack entry for the new event. In the illustrated implementation, the event stack entries are broken into 64-byte blocks. As such, the necessary number of blocks are reserved by incrementing the event stack pointer by the appropriate amount necessary to incorporate the full message record provided to the function. For implementations that utilize fixed-size message records, however, a fixed offset may be added to the event stack pointer in the alternative. Moreover, it should be appreciated that utilizing a circular event stack may necessitate additional boundary checking to ensure that the event stack pointer will rotate around to the beginning of the event stack once the end of the memory allocated for the stack is reached. This is typically handled by updating the pointers to point to the top of the event stack whenever there is insufficient space to insert a maximum size (e.g., 256 byte) event within the remaining memory allocated in the event stack.

Next, block 184 copies the data provided to the function directly into the reserved target logical partition event stack entry, thereby by-passing the use of the pending queue for the target logical partition. Moreover, in block 186, if an available message was allocated due to the need for an ACK in response to the event, such available message is enqueued onto the ACK queue to reserve the message for the upcoming acknowledgment expected from the target logical partition. Control then passes to block 188 to set the valid flag for the event stack entry, and then to block 180 to return a "success" code to the source logical partition.

Upon the return of a "success" or "error" code back to the source logical partition (from any of blocks 162, 168 or 180, and represented at 190), function 156 is complete. As illustrated in FIG. 5, upon return of a code to the source logical partition, the partition determines in block 192 whether an error has been indicated by the partition manager. If so, the error is handled as illustrated at block 194. If no error is returned, processing continues as normal, as illustrated in block 196. It will be appreciated that error handling and further processing will vary depending on the particular error received and type of event that was initiated, a discussion of which is not necessary for a complete understanding of the invention.

As can be seen from FIG. 5, function 156 is optimized to bypass the need to place a pending event on a pending queue, and require a target logical partition to initiate retrieval of the pending event from that queue, whenever it is determined that an unused entry exists on the target logical partition event stack. Moreover, if such an event further does not require any ACK, the allocation of a message record on the ACK queue is also bypassed. By doing so, the overhead associated with moving message records onto the pending and/or ACK queues is avoided, and processing of the event is accelerated, typically due to reduced serialization requirements. In other implementations, however, it may be desirable to require that all events pass through the same queue mechanisms as described herein. Therefore, checking whether the target logical partition event stack is full in blocks 164 and 174, as well as the operations performed in blocks 182–188 of function 156, may be omitted in other implementations consistent with the invention.

FIGS. 6A and 6B next illustrate, from the perspective of the event handler of a target logical partition, a process incoming events routine 200 executed by the event handler. As illustrated at 202, once initialized, the event handler of a target logical partition periodically polls the valid and pending flags for the event stack associated therewith to determine whether any pending events are available for processing by the target logical partition. Typically, polling for pending events is performed during dispatch windows, e.g., in time periods between task switches, after expiration of periodic timers, and in other situations that will be apparent to one of ordinary skill in the art. In this implementation, the pending flag is associated with the entire event stack, and indicates when events are stored in the pending queue within the partition manager, awaiting retrieval by the target logical partition. Further, a valid flag is typically the first bit within an entry on the target logical partition event stack.

As illustrated at block 204, during each dispatch window, routine 200 first determines whether the pending flag is set. If not, control passes to block 206 to determine whether a valid flag associated with an entry in the event stack is set. If not, control returns to block 202 to wait until the next dispatch window to re-poll for pending events.

Returning to block 204, if the pending flag is set, control passes to block 208 to call a getPendingLPEvents( ) function 210 in the partition manager (represented at 212). Function 210 begins in block 214 by dequeueing the next message from the pending queue associated with the target logical partition, typically by returning the pointer to the first message record on the pending queue and updating the linked list implementation of the pending queue to skip that record. Block 216 next determines whether the pending message was successfully dequeued (that is, whether an unprocessed pending message was found on the queue).

Assuming first that a pending message was successfully dequeued, control passes to block 218 to copy the event data in the message record dequeued from the pending queue into the current entry in the target logical partition event stack. Next, block 220 determines whether the event is a signal (or new) event requiring an ACK, typically by checking flags 122c and 122d of the message record. If so, control passes to block 222 to enqueue the message on the target logical partition's ACK queue, thereby reserving a message record for the expected acknowledgment. Control then passes to block 224 to increment the target logical partition event stack pointer maintained by the event manager by the size of the event (aligned on 64-byte boundaries). Control then passes to block 226 to determine whether space is still available in the target logical partition event stack.

If space in the event stack is still available, control passes to block 214 to attempt to dequeue the next message from the pending queue. As long as space is still available, each pending message record is subsequently dequeued from the pending queue and copied onto the target logical partition event stack. As shown in block 216, once all pending messages have been dequeued, control passes to block 230 to clear the pending flag in the target logical partition memory associated with the target logical partition event stack, indicating to the target logical partition that no more pending events are stored in the queue. Control then returns to the event handler for the target logical partition, as represented at 232. Moreover, returning to block 226, if the target logical partition event stack is full prior to dequeueing all pending messages, control returns to the event handler without clearing the pending flag therefor, indicating to the target logical partition event handler that additional events remain pending on the queue therefor.

Returning to block 206, if a valid flag for any entry in the target logical partition event stack is set (which may be as a result of direct copying by the partition manager in function 156, or by virtue of copying from the pending queue in function 210), control passes to block 234, illustrated in FIG. 6B. Block 234 attempts to decode the next event entry on the logical partition event stack. Block 236 next determines whether the event is an ACK. If so, control passes to block 238 to call the appropriate ACK handler for the event type specified in the message record therefor.

Control next passes to block 240 to clear the valid bit for the event entry. Prior to doing so, however, the corresponding first bit in every other block of data in the entry is cleared, starting with the last block, and progressing in a reverse order through the entry so that the last bit cleared for the entry is in the first block of the message record (i.e., the valid bit 122a). In addition, the target logical partition stack pointer is updated to point to the next entry in the event stack. Moreover, if the space between the new next pointer and the end of the stack is less than the maximum event size, the next pointer is set to point to the top of the event stack. By clearing the first bits associated with later blocks in each event entry prior to finally clearing the valid bit in the first block of the entry, it is ensured that the entry will not be copied over by the partition manager until processing of the event stored in the entry is completed by the target logical partition. In other implementations, other serialization mechanisms may be utilized to prevent pending events from being overwritten by the partition manager prior to completion of processing by the target logical partition.

Next, block 242 determines whether another event is pending on the logical partition event stack, by checking for an entry with a valid flag set. If so, control returns to block 234 to decode the next event. If not, however, control returns to block 202 (FIG. 6A) to wait for receipt of future events in a later dispatch window.

Returning to block 236, if the decoded event is not an ACK event, control passes to block 244 to call the appropriate event handler for the event type specified in the message record. Next, block 246 determines whether an ACK is required by the event, typically by checking flag 122c of the message record stored in the entry. If not, control passes directly to block 240 to complete processing of the event.

If, however, an ACK event is required, control passes to block 248 to generate message record data for the ACK event (e.g., in the reserved space illustrated at 103 of FIG. 3). Control then passes to block 250 to call a signalLPACK( ) function 252 in the partition manager (represented at 254).

Function 252 begins in block 256 by attempting to find a matching message on the ACK queue, typically by comparing the correlation token and/or the source and target instance ID's associated with the message record data provided with the function call. Block 258 determines whether the matching record was found. If not, a "no ACK message" error is returned to the target logical partition in block 260. If, however, the corresponding ACK message is found, control passes to block 262 to copy the ACK message data from the target logical partition memory into the ACK message previously allocated on the ACK queue. Block 264 next enqueues the message onto the pending queue for the source logical partition, and block 266 sets the pending flag in the source logical partition memory to indicate that a pending ACK is available for processing by the source logical partition. A "success" code is then returned to the target logical partition in block 268 (represented at 270). Function 252 is then complete.

Upon return from the function call, control passes to block 272 to determine whether an error was returned. If so, the error is handled in an appropriate manner, as represented at 274. If no error is returned, however, control passes to block 240 to complete processing of the event.

It will be appreciated that placing the ACK on the pending queue for the source logical partition (due to initiating function 252 from the target logical partition) will result in the event handler of the source logical partition calling the getPendingLPEvents( ) function from the corresponding routine 200 executed within the source logical partition. Handling of the ACK event then proceeds in the same manner discussed above for the target logical partition.

FIG. 7 next illustrates a cancel event routine 280 that may be initiated by a source logical partition whenever it is desirable to cancel a pending event prior to processing by a target logical partition. It may be desirable to cancel an event, for example, should the source logical partition determine that no response has been received within an allowable time. As an example, after signaling an event to a target logical partition, a source logical partition may set a timer that sets an allowable period of time during which any response should be received. If the time expires without receiving a response from the target logical partition, it may be desirable to simply cancel the event rather than continuing to wait. Other instances may necessitate cancellation of an event in other implementations.

Routine 280 begins in block 282 by calling a cancelLPEvent( ) function 284 in the partition manager (represented at 286). Function 284 begins in block 288 by attempting to find a matching message record on either the ACK or pending queue associated with the target logical partition specified in the function call. Next, block 290 determines whether a matching record was found (typically as a result of a matching correlation token and source and target instance ID's). If no such matching record is found, block 290 passes control to block 292 to return a "not found" error to the source logical partition. If, however, such a matching record is found, control passes to block 294 to modify the message data in the message record to indicate that the event was canceled, typically by setting a specific return code in the message record. Next, in block 296, the message record is enqueued onto the pending queue for the source logical partition, and in block 298, the pending flag for the source logical partition event stack is set. Next, block 300 returns a "success" code to the source logical partition, and processing returns to the source logical partition, as represented at 302. Then, based upon whether or not an error is indicated, block 304 either passes control to a suitable error handler 306 to handle the error, or to continue processing in an appropriate manner, as represented at 308. Placing the canceled message record on the pending queue for the source logical partition will then initiate retrieval and processing of the cancelled event during the next dispatch window for the event handler in the source logical partition.

Figure 8:
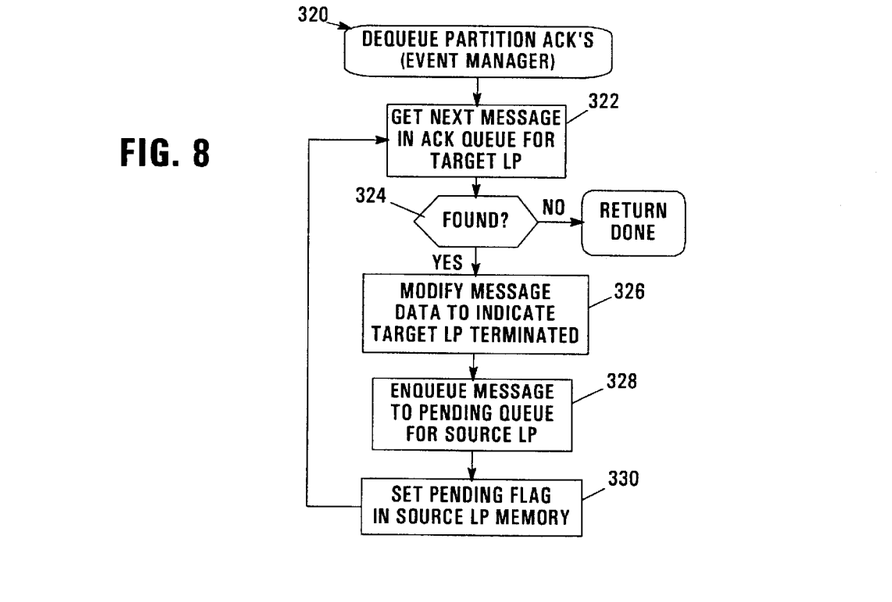
FIG. 8 is a flowchart illustrating the program flow of a dequeue partition ACK's routine for the event-driven communications interface in the computer of FIGS. 1–2.

FIG. 8 next illustrates a dequeue partition ACK's routine 320 that may be executed by an event manager in response to a determination that a particular logical partition has terminated. Typically, routine 320 is called by another component of the partition manager during shut down of a logical partition. A number of additional operations are performed during termination of a logical partition, but which are beyond the scope of this disclosure. Hence, these other operations are not discussed separately herein.

Routine 320 is utilized to implement guaranteed acknowledgment of events signaled by any source logical partition. In addition, as discussed above, routine 320 is also utilized to provide notification to other logical partitions that a particular logical partition has terminated. To do so, routine 320 begins in block 322 by getting the next message record in the ACK queue for the target logical partition being terminated. As long as such a message is found, block 324 passes control to block 326 to modify the message data to indicate that the target logical partition is terminated, typically by setting a unique return code in the message record. The message record is then enqueued in block 328 to the pending queue for the source logical partition identified in the message record. Next, block 330 sets the pending flag in the source logical partition memory, and control returns to block 322 to obtain the next message from the ACK queue for the target logical partition. Once all such messages have been moved from the target logical partition ACK queue to the appropriate pending queues for the source logical partitions associated with the messages, routine 320 is complete.

Once the messages, with the unique codes, are placed on the pending queues for the initiating logical partitions, those logical partitions will then retrieve those message records in the manner discussed above, and be able to decode the messages to determine that the target logical partition has been terminated. As discussed above, such an implementation permits a primary logical partition, for example, to be notified whenever a secondary logical partition unexpectedly terminates. Moreover, it will be appreciated that if separate deferred and immediate ACK queues are supported for each target logical partition, routine 320 may only operate on the deferred ACK queue associated with a terminated target logical partition.

It will be appreciated that the underlying communication mechanisms for both signal and ACK events are highly symmetrical, and are typically received and processed by a target logical partition in much the same manner. In other implementations, however, separate communication paths for signal and ACK events may be utilized in the alternative.

It should be appreciated that any combination of events and event types may be supported consistent with the invention. For example, in one implementation, which is by no means exclusive, five separate event types may be utilized: a partition manager event type, a machine facilities event type, a session manager event type, an input/output completion event type, and a virtual bus event type.

The partition manager event type may be used to send signals from the partition manager to the primary partition indicating abnormal termination of a secondary logical partition, completion of a primary-directed reset of a secondary logical partition, and completion of the reset of all input/output (I/O) devices allocated to a terminating secondary logical partition, among other operations.

A machine facilities event type may be used to communicate between a secondary logical partition and the primary logical partition in order to share machine facilities such as a service processor or various power control mechanisms. In addition, a machine facilities event type may be used to send partition power down and initial program load (IPL) requests from a secondary logical partition to a primary logical partition.

A session manager event type may be used to implement higher-level session-level communication mechanisms between a primary logical partition and secondary logical partitions. Multiple sessions may then be transmitted over the same basic event path using such an event type.

An input-output completion event type may be utilized to communicate I/O completion interrupts, as well as other I/O interrupts, from the partition manager to the various logical partitions via the event-driven communication system.

A virtual bus event type may be utilized to establish and communicate data across a virtual bus between various logical partitions in a logically-partitioned computer. As an example, the AS/400 series midrange computers from International Business Machines Corporation support high-speed hardware buses between clustered AS/400 computers, also known as OptiConnect™ buses. With this type of event, the event-driven communications interface may be utilized to emulate such a physical high-speed hardware bus in such a manner that multiple logical partitions operate as a cluster in much the same manner as multiple physical computers. Through this protocol, and through the use of suitable higher-level functionality that accesses the event-driven communications interface, the fact that the bus is virtual may be made transparent to practically all of the software executing in a logical partition that drives the high-speed interconnect. As a consequence, the same clustering software used to interconnect multiple physical computers may be utilized in the same manner, and without modification, on a logically-partitioned computer.

Other modifications will become apparent to one of ordinary skill in the art. Therefore, the invention lies in the claims hereinafter appended.

What is claimed is:

1. An apparatus, comprising:
   (a) a plurality of logical partitions, each configured to operate in an independent address space;
   (b) a partition manager accessible by the plurality of logical partitions; and
   (c) an event-driven communications interface configured to communicate information between the plurality of logical partitions via the partition manager.

2. The apparatus of claim 1, wherein the plurality of logical partitions includes a primary logical partition and a secondary logical partition, and wherein at least a portion of the partition manager is resident in the primary logical partition.

3. An apparatus, comprising:
   (a) a plurality of logical partitions, each configured to operate in an independent address space, wherein the plurality of logical partitions includes a source logical partition and a target logical partition;
   (b) a partition manager accessible by the plurality of logical partitions; and
   (c) an event-driven communications interface configured to communicate information between the plurality of logical partitions via the partition manager, wherein the event-driven communications interface comprises:
      (i) an event generator, resident in the source logical partition and configured to generate an event associated with the target logical partition;
      (ii) an event handler, resident in the target logical partition and configured to process the event; and
      (iii) an event manager, resident in the partition manager and accessible by the plurality of logical partitions, the event manager configured to communicate the event generated by the event generator of the source logical partition to the event handler of the target logical partition.

4. The apparatus of claim 3, wherein the event-driven communications interface further comprises a plurality of event storage data structures, each resident in a logical partition and associated with a pending indicator, wherein the event manager is configured to notify the target logical partition of a pending event by setting the pending indicator to a predetermined value, and wherein the event handler in the target logical partition is configured to detect the pending event by reading the pending indicator.

5. The apparatus of claim 4, wherein each event storage data structure includes an event stack.

6. The apparatus of claim 4, wherein the event-driven communications interface further includes a pending queue, and wherein the event manager is further configured to:
   (a) temporarily store an event generated by the event generator of the source logical partition in the pending queue; and
   (b) copy the event to the event storage data structure of the target logical partition in response to a request by the event handler in the target logical partition.

7. The apparatus of claim 6, wherein the event-driven communications interface further includes an acknowledgment queue configured to store an acknowledgment to an event generated by the event generator in the source logical partition.

8. The apparatus of claim 7, wherein the event manager is configured to ensure delivery of an acknowledgment to the source logical partition in response to generation of an event by the event generator of the source logical partition that requests such acknowledgment.

9. The apparatus of claim 7, wherein the event manager is configured to automatically return to the source logical partition a pending acknowledgment on the acknowledgment queue associated with the target logical partition in response to termination of the target logical partition.

10. The apparatus of claim 7, wherein the event-driven communications interface further includes an available queue, wherein each of the pending, acknowledgment and available queues store events in the form of message records, and wherein the available queue is configured to stored at least one unused message record for use by the pending and acknowledgment queues.

11. The apparatus of claim 6, wherein the event manager is configured to copy an event directly from the source logical partition to the event storage data structure of the target logical partition, thereby bypassing the pending queue, in response to detecting available space in the event storage data structure.

12. The apparatus of claim 6, wherein the event manager is further configured to cancel an event pending on the pending queue in response to a cancel request from the source logical partition.

13. An apparatus, comprising:
  (a) a memory;
  (b) a plurality of processors, coupled to the memory; and
  (c) an event-driven communications interface configured to execute on at least one of the plurality of processors to communicate information between a plurality of logical partitions, each logical partition configured to operate in an independent address space in the memory, and each logical partition under the control of a partition manager accessible by the plurality of logical partitions, the event-driven communications interface including:
    (1) an event generator at least partially resident in a source logical partition from the plurality of logical partitions, the event generator configured to generate in the independent address space associated with the source logical partition an event to be processed by a target logical partition from the plurality of logical partitions;
    (2) an event handler at least partially resident in the target logical partition and configured to process the event; and
    (3) an event manager at least partially resident in the partition manager, the event manager configured to copy the event generated by the event generator from the independent address space associated with the source logical partition to the independent address space associated with the target logical partition.

14. A method of communicating information between a plurality of logical partitions in a computer system, the method comprising:
  (a) passing an event between a source logical partition and a target logical partition via an event-driven communications interface at least partially implemented in a partition manager that is accessible by both of the source and target logical partitions; and
  (b) processing the event in the target logical partition.

15. The method of claim 14, wherein the plurality of logical partitions includes a primary logical partition and a secondary logical partition, and wherein at least a portion of the partition manager is resident in the primary logical partition.

16. The method of claim 14, wherein the source and target logical partitions each operate in an independent address space that is inaccessible by the other logical partition.

17. A method of communicating information between a plurality of logical partitions in a computer system, the method comprising:
  (a) passing an event between a source logical partition and a target logical partition via an event-driven communications interface at least partially implemented in a partition manager that is accessible by both of the source and target logical partitions, wherein the event-driven communications interface includes an event storage data structure resident in the target logical partition and having associated therewith a pending indicator;
  (b) notifying the target logical partition of a pending event by setting the pending indicator to a predetermined value;
  (c) detecting the pending event in the target logical partition by reading the pending indicator; and
  (d) processing the event in the target logical partition.

18. The method of claim 17, wherein the event-driven communications interface further includes a pending queue resident in the partition manager, the method further comprising:
  (a) generating the event in the source logical partition;
  (b) temporarily storing the event in the pending queue; and
  (c) copying the event to the event storage data structure of the target logical partition in response to a request by the target logical partition.

19. The method of claim 18, wherein the event-driven communications interface further includes an acknowledgment queue, the method further comprising:
  (a) generating an acknowledgment to the event in the target logical partition;
  (b) storing the acknowledgment in the acknowledgment queue; and
  (c) copying the acknowledgment to the source logical partition.

20. The method of claim 19, further comprising automatically returning to the source logical partition a pending acknowledgment on the acknowledgment queue associated with the target logical partition in response to termination of the target logical partition.

21. The method of claim 19, wherein the event-driven communications interface further includes an available queue, wherein each of the pending, acknowledgment and available queues store events in the form of message records, and wherein the available queue is configured to stored at least one unused message record for use by the pending and acknowledgment queues.

22. The method of claim 18, further comprising copying the event directly from the source logical partition to the event storage data structure of the target logical partition, thereby bypassing the pending queue, in response to detecting available space in the event storage data structure.

23. The method of claim 18, further comprising canceling an event pending on the pending queue in response to a cancel request from the source logical partition.

24. A program product, comprising:
  (a) a program including an event-driven communications interface configured to communicate information between a plurality of logical partitions via a partition manager accessible by each of the plurality of logical partitions, wherein each logical partition is configured to operate in an independent address space; and
  (b) a signal bearing medium bearing the program.

25. The program product of claim 24, wherein the signal bearing medium includes at least one of a recordable medium and a transmission-type medium.

* * * * *